(12) United States Patent  
Raghavan (10) Patent No.: US 7,442,145 B2
(45) Date of Patent: Oct. 28, 2008

(54) MULTI-SPEED TRANSMISSIONS WITH A LONG PINION

(75) Inventor: Madhusudan Raghavan, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 127 days.

(21) Appl. No.: 11/421,775

(22) Filed: Jun. 2, 2006

(65) Prior Publication Data

US 2007/0281821 A1 Dec. 6, 2007

(51) Int. Cl.
F16H 3/44 (2006.01)
(52) U.S. Cl. ............... 475/286; 475/313; 475/319; 475/325
(58) Field of Classification Search ........... 475/275, 475/276, 277, 278, 279, 280, 282, 284, 286, 475/288, 290, 311, 313, 317, 319, 323, 325
See application file for complete search history.

(56) References Cited

U.S. PATENT DOCUMENTS

| | | | | |
|---|---|---|---|---|
| 4,070,927 A | 1/1978 | Polak | ........... | 475/286 |
| 4,709,594 A | 12/1987 | Maeda | ........... | 475/280 |
| 5,106,352 A | 4/1992 | Lepelletier | ........... | 475/280 |
| 5,226,862 A * | 7/1993 | Hattori | ........... | 475/286 |
| 5,385,064 A | 1/1995 | Reece | ........... | 74/331 |
| 5,497,867 A | 3/1996 | Hirsch et al. | ........... | 192/48.91 |
| 5,560,461 A | 10/1996 | Loeffler | ........... | 192/53.32 |
| 5,599,251 A | 2/1997 | Beim et al. | ........... | 475/275 |
| 5,641,045 A | 6/1997 | Ogawa et al. | ........... | 192/53.341 |
| 5,651,435 A | 7/1997 | Perosky et al. | ........... | 192/219 |
| 5,975,263 A | 11/1999 | Forsyth | ........... | 192/53.32 |
| 6,053,839 A | 4/2000 | Baldwin et al. | ........... | 475/281 |
| 6,071,208 A | 6/2000 | Koivunen | ........... | 475/275 |
| 6,083,135 A | 7/2000 | Baldwin et al. | ........... | 475/276 |
| 6,217,474 B1 | 4/2001 | Ross et al. | ........... | 475/269 |
| 6,354,416 B1 | 3/2002 | Eo | ........... | 192/53.341 |
| 6,375,592 B1 | 4/2002 | Takahashi et al. | ........... | 475/262 |
| 6,422,969 B1 | 7/2002 | Raghavan et al. | ........... | 475/276 |
| 6,425,841 B1 | 7/2002 | Haka | ........... | 475/275 |
| 6,471,615 B1 | 10/2002 | Naraki et al. | ........... | 475/262 |
| 6,558,287 B2 | 5/2003 | Hayabuchi et al. | ........... | 475/271 |
| 6,623,397 B1 | 9/2003 | Raghavan et al. | ........... | 360/96.5 |
| 6,802,795 B2 * | 10/2004 | Miyazaki et al. | ........... | 475/275 |
| 6,840,885 B2 | 1/2005 | Yi et al. | ........... | 475/276 |
| 6,935,985 B2 * | 8/2005 | Ishimaru | ........... | 475/296 |
| 6,962,549 B2 * | 11/2005 | Dreibholz et al. | ........... | 475/284 |
| 7,235,032 B2 * | 6/2007 | Thomas et al. | ........... | 475/284 |
| 7,267,631 B2 * | 9/2007 | Bauer | ........... | 475/278 |
| 7,294,087 B2 * | 11/2007 | Hayabuchi et al. | ........... | 475/276 |
| 2006/0035744 A1 * | 2/2006 | Seo et al. | ........... | 475/284 |
| 2006/0270515 A1 * | 11/2006 | Kobayashi et al. | ........... | 475/275 |

FOREIGN PATENT DOCUMENTS

| | | | | |
|---|---|---|---|---|
| JP | 406200998 A * | 7/1994 | ........... | 475/280 |
| JP | 09-126283 | 5/1997 | | |

* cited by examiner

Primary Examiner—Roger Pang (57) ABSTRACT

The family of transmissions has a plurality of members that can be utilized in powertrains to provide at least six forward speed ratios and one reverse speed ratio. The transmission family members include three planetary gear sets having up to seven torque-transmitting mechanisms and two interconnecting members. The powertrain includes an engine that is selectively or continuously connectable to at least one of the planetary gear members and an output shaft that is continuously connected with another one of the planetary gear members. The torque-transmitting mechanisms provide interconnections between various gear members, the input shaft and the transmission housing, and are operated in combinations to establish at least six forward speed ratios and at least one reverse speed ratio.

16 Claims, 5 Drawing Sheets

FIG. 1a

| | RATIOS | 50 | 52 | 54 | 55 | 57 |
|---|---|---|---|---|---|---|
| Reverse | -1.96 | | X | | X | X |
| Neutral | | | X | | | X |
| 1 | 3.57 | X | X | | | X |
| 2 | 2.27 | X | | X | | X |
| 3 | 1.37 | | X | X | | X |
| 4 | 1.00 | X | X | X | | |
| 5 | 0.68 | | X | X | X | |
| 6 | 0.51 | X | | X | X | |

(X = ENGAGED CLUTCH)

| FIXED-RATIO MODE | |
|---|---|
| RATIO SPREAD | 7.06 |
| RATIO STEPS | |
| Rev/1 | -0.55 |
| 1/2 | 1.57 |
| 2/3 | 1.66 |
| 3/4 | 1.37 |
| 4/5 | 1.47 |
| 5/6 | 1.35 |

SAMPLE DESIGN:

$\frac{\text{RING GEAR}}{\text{SUN GEAR}}$ TOOTH RATIO: $\frac{N_{R1}}{N_{S1}} = 1.82$, $\frac{N_{R2}}{N_{S2}} = 2.37$, $\frac{N_{R3}}{N_{S3}} = 2.57$

| | RATIOS | 150 | 152 | 154 | 155 | 157 |
|---|---|---|---|---|---|---|
| Reverse | -2.22 | X | X | | X | |
| Neutral | | X | X | | | |
| 1 | 2.29 | X | X | | | X |
| 2 | 1.40 | X | | X | | X |
| 3 | 1.00 | X | X | X | | |
| 4 | 0.73 | | X | X | | X |
| 5 | 0.51 | | X | X | X | |
| 6 | 0.42 | | | X | X | X |

(X = ENGAGED CLUTCH)

| FIXED-RATIO MODE | |
|---|---|
| RATIO SPREAD | 5.51 |
| RATIO STEPS | |
| Rev/1 | -0.97 |
| 1/2 | 1.64 |
| 2/3 | 1.40 |
| 3/4 | 1.37 |
| 4/5 | 1.43 |
| 5/6 | 1.23 |

SAMPLE DESIGN:

$\frac{\text{RING GEAR}}{\text{SUN GEAR}}$ TOOTH RATIO: $\frac{N_{R_1}}{N_{S_1}} = 1.57$, $\frac{N_{R_2}}{N_{S_2}} = 2.37$, $\frac{N_{R_3}}{N_{S_3}} = 2.50$

| | RATIOS | 250 | 252 | 254 | 255 | 256 | 257 |
|---|---|---|---|---|---|---|---|
| Reverse | -2.65 | | | X | X | X | |
| Neutral | 0.00 | | | | X | X | |
| 1 | 5.37 | | | | X | X | X |
| 2 | 2.99 | | X | | | X | X |
| 3 | 2.11 | | X | | X | | X |
| 4 | 1.54 | | X | X | | | X |
| 5 | 1.00 | X | X | | | | X |
| 6 | 0.72 | X | | X | | | X |
| 7 | 0.64 | X | | | X | | X |

| FIXED-RATIO MODE | |
|---|---|
| RATIO SPREAD | 8.40 |
| RATIO STEPS | |
| Rev/1 | -0.49 |
| 1/2 | 1.79 |
| 2/3 | 1.41 |
| 3/4 | 1.36 |
| 4/5 | 1.54 |
| 5/6 | 1.37 |
| 6/7 | 1.13 |

(X = ENGAGED CLUTCH)

SAMPLE DESIGN:

$\frac{\text{RING GEAR}}{\text{SUN GEAR}}$ TOOTH RATIO: $\frac{N_{R1}}{N_{S1}} = 2.0$, $\frac{N_{R2}}{N_{S2}} = 3.0$, $\frac{N_{R3}}{N_{S3}} = 2.02$

| RATIOS | | 350 | 352 | 354 | 355 | 356 | 357 | 358 |
|---|---|---|---|---|---|---|---|---|
| Reverse | -3.51 | X | | X | X | | | X |
| Neutral | 0.00 | X | | X | X | | | |
| 1 | 8.09 | X | | X | X | X | | |
| 2 | 5.00 | X | | X | | | X | X |
| 3 | 2.44 | X | | X | X | | X | |
| 4 | 1.64 | X | X | | X | | | X |
| 5 | 1.36 | X | X | | X | X | | |
| 6 | 1.22 | X | X | | X | | X | |
| 7 | 1.00 | X | X | X | X | | | |
| 8 | 0.80 | | X | X | X | | X | |

| FIXED-RATIO MODE | |
|---|---|
| RATIO SPREAD | 10.11 |
| RATIO STEPS | |
| Rev/1 | -0.43 |
| 1/2 | 1.62 |
| 2/3 | 2.05 |
| 3/4 | 1.49 |
| 4/5 | 1.21 |
| 5/6 | 1.11 |
| 6/7 | 1.22 |
| 7/8 | 1.25 |

(X = ENGAGED CLUTCH)

SAMPLE DESIGN:

$\frac{\text{RING GEAR}}{\text{SUN GEAR}}$ TOOTH RATIO: $\frac{N_{R1}}{N_{S1}} = 2.21$, $\frac{N_{R2}}{N_{S2}} = 1.53$, $\frac{N_{R3}}{N_{S3}} = 2.57$

| | RATIOS | 450 | 452 | 454 | 455 | 456 | 457 | 458 |
|---|---|---|---|---|---|---|---|---|
| Reverse #2 | -8.62 | | | | X | X | X | |
| Reverse #1 | -2.65 | | | X | X | X | | |
| Neutral | 0.00 | | | X | X | | | |
| 1 | 5.97 | | | X | | X | | X |
| 2 | 3.00 | | X | X | | X | | |
| 3 | 2.04 | | X | X | | | | X |
| 4 | 1.55 | | X | X | | | X | |
| 5 | 1.32 | | X | | X | | X | |
| 6 | 1.00 | X | X | | X | | | |
| 7 | 0.79 | X | | | X | | X | |
| 8 | 0.73 | X | | | X | | | X |
| 9 | 0.65 | X | | X | | | | X |

| FIXED-RATIO MODE | |
|---|---|
| RATIO SPREAD | 9.22 |
| RATIO STEPS | |
| Rev#2/1 | -1.44 |
| 1/2 | 1.99 |
| 2/3 | 1.47 |
| 3/4 | 1.32 |
| 4/5 | 1.17 |
| 5/6 | 1.32 |
| 6/7 | 1.27 |
| 7/8 | 1.08 |
| 8/9 | 1.12 |

(X = ENGAGED CLUTCH)

SAMPLE DESIGN:

$$\frac{\text{RING GEAR}}{\text{SUN GEAR}} \text{ TOOTH RATIO: } \frac{N_{R1}}{N_{S1}} = 3.07, \frac{N_{R2}}{N_{S2}} = 2.65, \frac{N_{R3}}{N_{S3}} = 2.25$$

FIG. 5b

MULTI-SPEED TRANSMISSIONS WITH A LONG PINION

TECHNICAL FIELD

The present invention relates to a family of power transmissions having three planetary gear sets that are controlled by up to seven torque-transmitting devices to provide at least six forward speed ratios and at least one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; and U.S. Pat. No. 6,422,969 issued to Raghavan and Usoro on Jul. 23, 2002.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

Seven-speed transmissions are disclosed in U.S. Pat. No. 6,623,397 issued to Raghavan, Bucknor and Usoro. Eight speed transmissions are disclosed in U.S. Pat. No. 6,425,841 issued to Haka. The Haka transmission utilizes three planetary gear sets and six torque transmitting devices, including two brakes and two clutches, to provide eight forward speed ratios and a reverse speed ratio. One of the planetary gear sets is positioned and operated to establish two fixed speed input members for the remaining two planetary gear sets. Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

It is an object of the present invention to provide an improved family of transmissions having three planetary gear sets controlled to provide at least six forward speed ratios and at least one reverse speed ratio.

In one aspect of the present invention, the family of transmissions has three planetary gear sets, each of which includes a first, second and third member, which members may comprise a sun gear, a ring gear, a planet carrier assembly member, or a pinion, in any order.

In referring to the first, second and third gear sets in this description and in the claims, these sets may be counted "first" to "third" in any order in the drawings (i.e., left to right, right to left, etc.).

In another aspect of the present invention, the planetary gear sets may be of the single pinion-type or of the double pinion-type.

In another aspect of the present invention, the planet carrier assembly member of the first planetary gear set is continuously connected with the planet carrier assembly member of the second planetary gear set. This connection is referred to herein as a first interconnecting member.

In yet another aspect of the present invention, the first and second planetary gear set are continuously connected via long pinion gears. This connection is referred to herein as a second interconnecting member.

In yet a further aspect of the invention, each family member incorporates an output shaft which is continuously connected with at least one member of the planetary gear sets. The input shaft is continuously or selectively connectable with at least one member of the planetary gear sets.

In still a further aspect of the invention, a first torque-transmitting mechanism, such as a clutch, selectively connects a member of the first or second planetary gear set with a member of the third planetary gear set.

In another aspect of the invention, a second torque-transmitting mechanism, such as a clutch, selectively connects a member of the third planetary gear set with another member of the first or second planetary gear set.

In a still further aspect of the invention, a third torque-transmitting mechanism, such as a clutch, selectively connects a member of the first or second planetary gear set with the input member or with another member of the third planetary gear set.

In a still further aspect of the invention, a fourth torque-transmitting mechanism, such as a brake, selectively connects a member of the first or second planetary gear set with a stationary member (transmission housing/casing).

In a still further aspect of the invention, a fifth torque-transmitting mechanism, such as a brake, selectively connects a member of the third planetary gear set with a stationary member (transmission housing/casing).

In still another aspect of the invention, an optional sixth torque-transmitting mechanism, such as a clutch, selectively connects a member of the third planetary gear set with a member of the first or second planetary gear set or with the input shaft.

In still another aspect of the invention, an optional seventh torque-transmitting mechanism, such as a brake, selectively connects a member of first, second or third planetary gear set with a stationary member (transmission housing/casing).

In still another aspect of the invention, the torque-transmitting mechanisms are selectively engageable in combinations to yield at least six forward speed ratios and at least one reverse speed ratio.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 1b is a truth table and chart depicting some of the operating characteristics of the powertrain shown in FIG. 1a;

FIG. 2b is a truth table and chart depicting some of the operating characteristics of the powertrain shown in FIG. 2a;

FIG. 3b is a truth table and chart depicting some of the operating characteristics of the powertrain shown in FIG. 3a;

FIG. 4b is a truth table and chart depicting some of the operating characteristics of the powertrain shown in FIG. 4a;

FIG. 5b is a truth table and chart depicting some of the operating characteristics of the powertrain shown in FIG. 5a.

DETAILED DESCRIPTION OF THE PREFERRED EMBODIMENTS

Figure 1A:
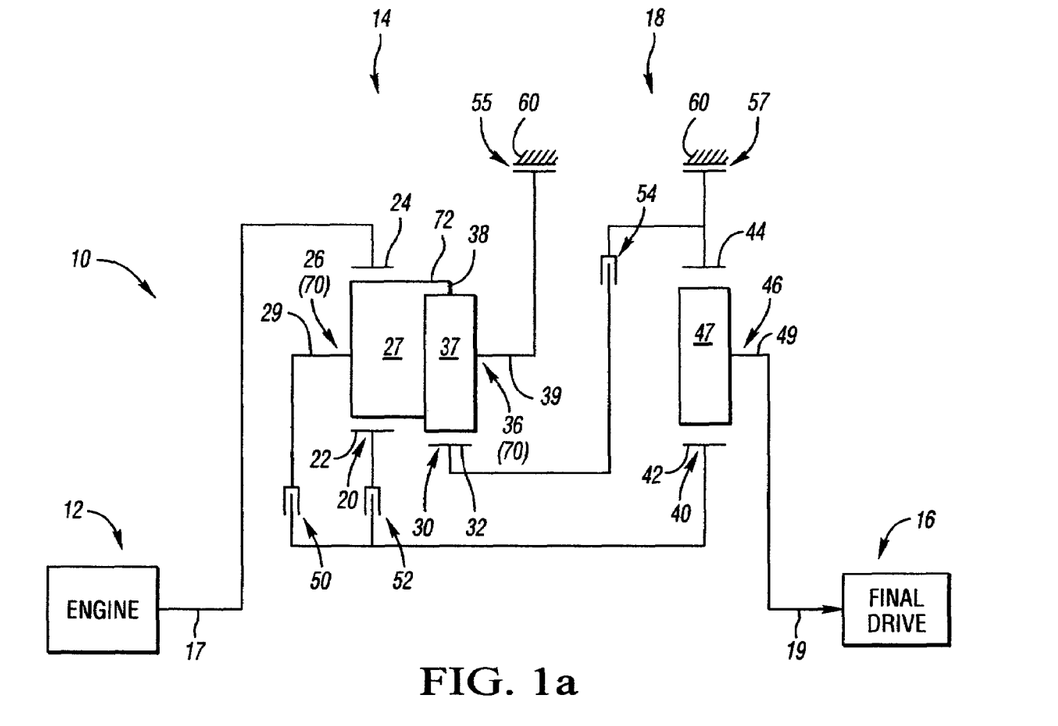
FIG. 1a is a schematic representation of a powertrain including a planetary transmission incorporating a family member of the present invention.

Referring to the drawings, wherein like characters represent the same or corresponding parts throughout the several views, there is shown in FIG. 1a a powertrain 10 having a conventional engine 12, a planetary transmission 14, and a conventional final drive mechanism 16.

The planetary transmission 14 includes an input shaft 17 connected with the engine 12, a planetary gear arrangement 18, and an output shaft 19 continuously connected with the final drive mechanism 16. The planetary gear arrangement 18 includes three planetary gear sets 20, 30 and 40.

The planetary gear set 20 includes a sun gear member 22, a ring gear member 24, and a planet carrier assembly member 26. The planet carrier assembly member 26 includes a plurality of long pinion gears 27 rotatably mounted on a carrier member 29 and disposed in meshing relationship with both the sun gear member 22 and the ring gear member 24.

The planetary gear set 30 includes a sun gear member 32 and a planet carrier assembly member 36. The planet carrier assembly member 36 includes a plurality of pinion gears 37, 38 rotatably mounted on a carrier member 39. The pinion gears 37 are disposed in meshing relationship with both the sun gear member 32 and the respective pinion gear 38. The planet carrier assembly member 36 is integral with the planet carrier assembly member 26. The pinion gears 38 are integral with the pinion gears 27 (i.e., they are formed by long pinion gears).

The planetary gear set 40 includes a sun gear member 42, a ring gear member 44, and a planet carrier assembly member 46. The planet carrier assembly member 46 includes a plurality of pinion gears 47 rotatably mounted on a carrier member 49, wherein the pinion gears 47 are disposed in meshing relationship with both the sun gear member 42 and the ring gear member 44.

The planetary gear arrangement also includes five torque-transmitting mechanisms 50, 52, 54, 55 and 57. The torque-transmitting mechanisms 50, 52 and 54 are rotating-type torque-transmitting mechanisms, commonly termed clutches. The torque-transmitting mechanisms 55 and 57 are stationary-type torque transmitting mechanisms, commonly termed brakes or reaction clutches.

The input shaft 17 is continuously connected with the ring gear member 24. The output shaft 19 is continuously connected with the planet carrier assembly member 46. The integral connection of the planet carrier assembly members 26 and 36 is referred to herein as the first interconnecting member 70. The integral connection of the long pinion gears 27, 38 is referred to herein as the second interconnecting member 72.

The planet carrier assembly member 26 is selectively connected with the sun gear member 42 through the clutch 50. The sun gear member 22 is selectively connected with the sun gear member 42 through the clutch 52. The sun gear member 32 is selectively connected with the ring gear member 44 through the clutch 54. The planet carrier assembly member 36 is selectively connected with the transmission housing 60 through the brake 55. The ring gear member 44 is selectively connected with the transmission housing 60 through the brake 57.

Figure 1B:
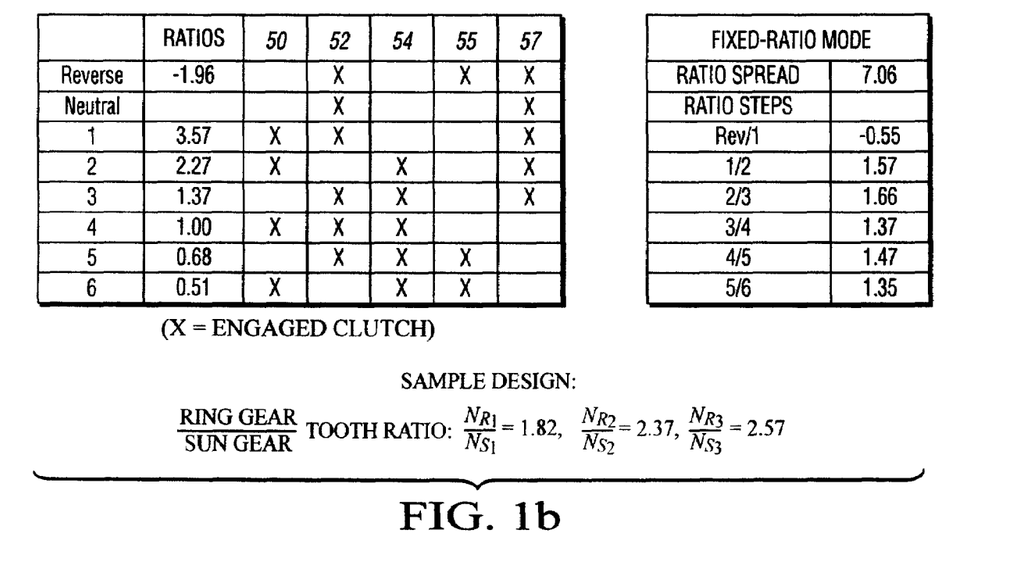

As shown in FIG. 1b, and in particular the truth table disclosed therein, the torque-transmitting mechanisms are selectively engaged in combinations of three to provide six forward speed ratios and one reverse speed ratio.

The reverse speed ratio is established with the engagement of the clutch 52 and the brakes 55 and 57. The clutch 52 connects the sun gear member 22 with the sun gear member 42. The brake 55 connects the planet carrier assembly member 36 with the transmission housing 60. The brake 57 connects the ring gear member 44 with the transmission housing 60.

The first forward speed ratio is establish with the engagement of the clutches 50, 52 and the brake 57. The clutch 50 connects the planet carrier assembly member 26 with the sun gear member 42. The clutch 52 connects the sun gear member 22 with the sun gear member 42. The brake 57 connects the ring gear member 44 with the transmission housing 60.

The second forward speed ratio is established with the engagement of the clutches 50, 54 and the brake 57. The clutch 50 connects the planet carrier assembly member 26 with the sun gear member 42. The clutch 54 connects the sun gear member 32 with the ring gear member 44. The brake 57 connects the ring gear member 44 with the transmission housing 60.

The third forward speed ratio is established with the engagement of the clutches 52, 54 and the brake 57. The clutch 52 connects the sun gear member 22 with the sun gear member 42. The clutch 54 connects the sun gear member 32 with the ring gear member 44. The brake 57 connects the ring gear member 44 with the transmission housing 60.

The fourth forward speed ratio is established with the engagement of the clutches 50, 52 and 54. In this configuration, the input shaft 17 is connected in a direct drive relationship with the output shaft 19. The numerical value of the fourth forward ratio is 1.

The fifth forward speed ratio is established with the engagement of the clutches 52, 54 and the brake 55. The clutch 52 connects the sun gear member 22 with the sun gear member 42. The clutch 54 connects the sun gear member 32 with the ring gear member 44. The brake 55 connects the planet carrier assembly member 36 with the transmission housing 60.

The sixth forward speed ratio is established with the engagement with the clutches 50, 54 and the brake 55. The clutch 50 connects the planet carrier assembly member 26 with the sun gear member 42. The clutch 54 connects the sun gear member 32 with the ring gear member 44. The brake 55 connects the planet carrier assembly member 36 with the transmission housing 60.

As set forth above, the engagement schedule for the torque-transmitting mechanisms is shown in the truth table of FIG. 1b. This truth table also provides an example of speed ratios that are available utilizing the ring gear/sun gear tooth ratios given by way of example in FIG. 1b. The $N_{R1}/N_{S1}$ value is the tooth ratio of the planetary gear set 20; the $N_{R2}/N_{S2}$ value is the tooth ratio of the planetary gear set 30; and the $N_{R3}/N_{S3}$ value is the tooth ratio of the planetary gear set 40. Also, the chart of FIG. 1b describes the ratio steps that are attained utilizing the sample of tooth ratios given. For example, the step ratio between the first and second forward speed ratios is 1.57, while the step ratio between the reverse and first forward ratio is −0.55.

Figure 2A:
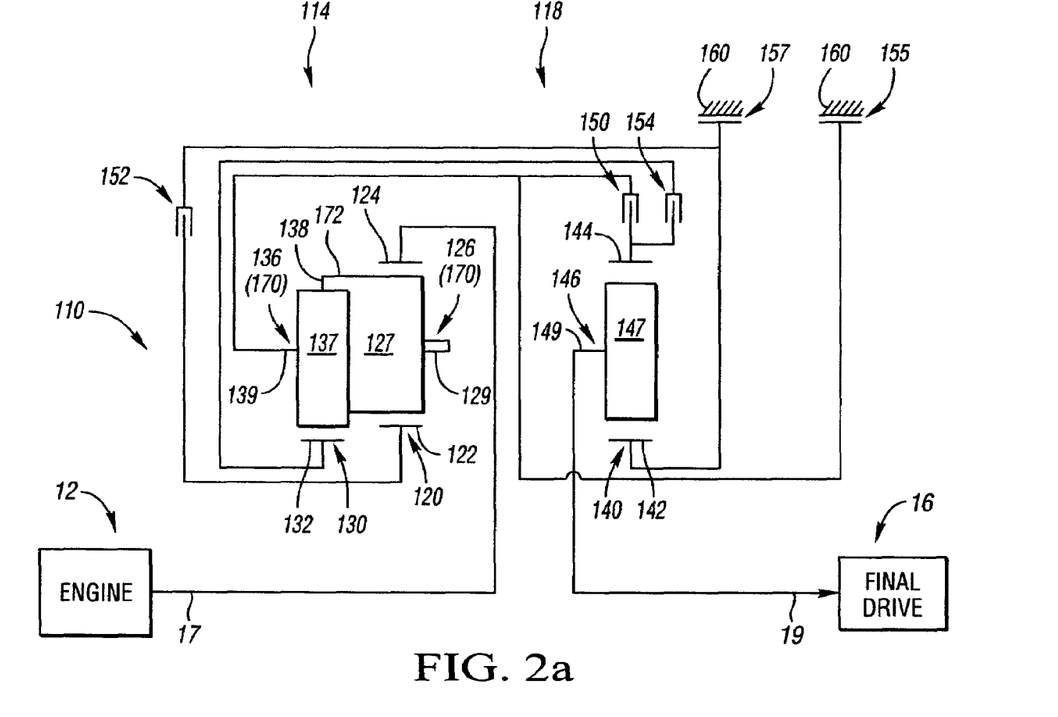
FIG. 2a is a schematic representation of a powertrain having a planetary transmission incorporating another family member of the present invention.

FIG. 2a shows a powertrain 110 having a conventional engine 12, a planetary transmission 114, and a conventional final drive mechanism 16.

The planetary transmission 114 includes an input shaft 17 continuously connected with the engine 12, a planetary gear arrangement 118, and an output shaft 19 continuously connected with the final drive mechanism 16. The planetary gear arrangement 118 includes three planetary gear sets 120, 130 and 140.

The planetary gear set 120 includes a sun gear member 122, a ring gear member 124 and a planet carrier assembly member 126. The planet carrier assembly member 126 includes a plurality of pinion gears 127 rotatably mounted on a carrier member 129. The pinion gears 127 are disposed in meshing relationship with both the sun gear member 122 and the ring gear member 124.

The planetary gear set 130 includes a sun gear member 132 and a planet carrier assembly member 136. The planet carrier assembly member 136 includes a plurality of pinion gears 137, 138 rotatably mounted on a carrier member. The pinion gears 137 are disposed in meshing relationship with both the sun gear member 132 and the respective pinion gear 138. The planet carrier assembly member 136 is integral with the planet carrier assembly member 126. The pinion gears 138 are integral with the pinion gears 127 (i.e., they are formed by long pinion gears).

The planetary gear set 140 includes a sun gear member 142, a ring gear member 144, and a planet carrier assembly member 146. The planet carrier assembly member 146 includes a plurality of pinion gears 147 rotatably mounted on a carrier member 149 and disposed in meshing relationship with both the sun gear member 142 and the ring gear member 144.

The planetary gear arrangement 118 also includes five torque-transmitting mechanisms 150, 152, 154, 155 and 157. The torque-transmitting mechanisms 150, 152, and 154 are rotating-type torque-transmitting mechanisms, commonly termed clutches. The torque-transmitting mechanisms 155 and 157 are stationary-type torque transmitting mechanisms, commonly termed brakes or reaction clutches.

The input shaft 17 is continuously connected with the ring gear member 124. The output shaft 19 is continuously connected with the planet carrier assembly member 146. The integral connection of the planet carrier assembly members 126, 136 is referred to herein as interconnecting member 170. The integral connection of the pinion gears 127, 138 is referred to herein as interconnecting member 172.

The planet carrier assembly member 136 is selectively connected with the ring gear member 144 through the clutch 150. The sun gear member 122 is selectively connected with the sun gear member 142 through the clutch 152. The sun gear member 132 is selectively connected with the ring gear member 144 through the clutch 154. The planet carrier assembly member 136 is selectively connected with the transmission housing 160 through the brake 155. The sun gear member 142 is selectively connected with the transmission housing through the brake 157.

Figure 2B:
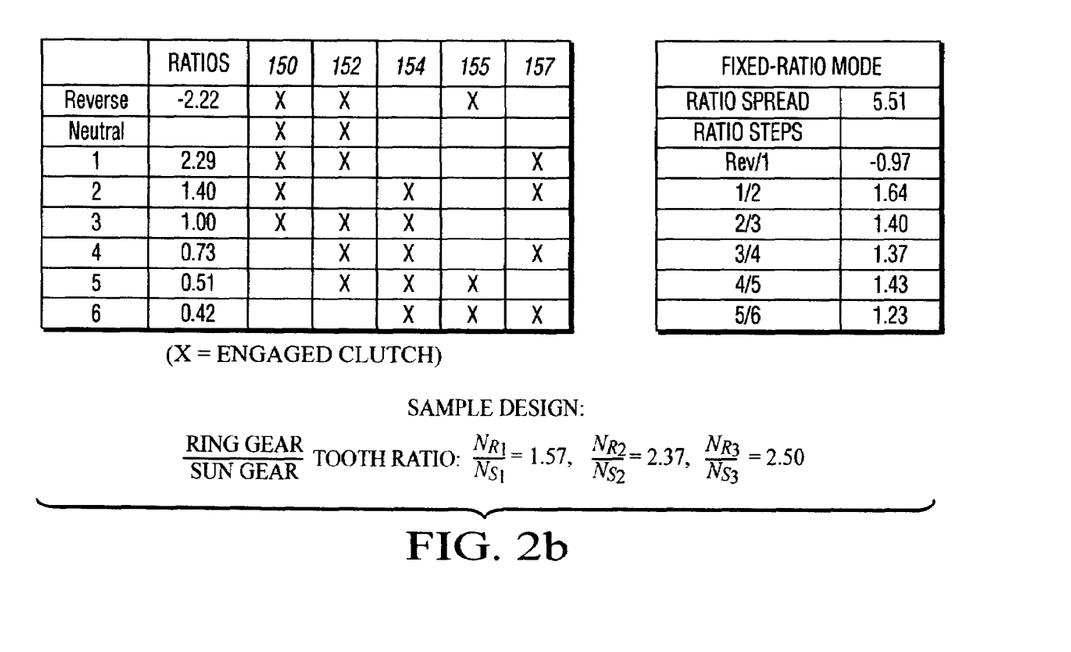

The truth table of FIG. 2b describes the engagement sequence utilized to provide six forward speed ratios and one reverse speed ratio in the planetary gear arrangement 118 shown in FIG. 2a.

The truth tables given in FIGS. 2b, 3b, 4b and 5b show the engagement sequences for the torque-transmitting mechanisms to provide at least six forward speed ratios and at least one reverse ratio. As shown and described above for the configuration in FIG. 1a, those skilled in the art will understand from the respective truth tables how the speed ratios are established through the planetary gear sets identified in the written description.

As set forth above, the truth table of FIG. 2b describes the engagement sequence of the torque-transmitting mechanisms utilized to provide one reverse drive ratio and six forward speed ratios. The truth table also provides an example of the ratios that can be attained with the family members shown in FIG. 2a utilizing the sample tooth ratios given in FIG. 2b. The $N_{R1}/N_{S1}$ value is the tooth ratio of the planetary gear set 120; the $N_{R2}/N_{S2}$ value is the tooth ratio of the planetary gear set 130; and the $N_{R3}/N_{S3}$ value is the tooth ratio of the planetary gear set 140. Also shown in FIG. 2b are the ratio steps between single step ratios in the forward direction as well as the reverse to first step ratio. For example, the first to second step ratio is 1.64.

Figure 3A:
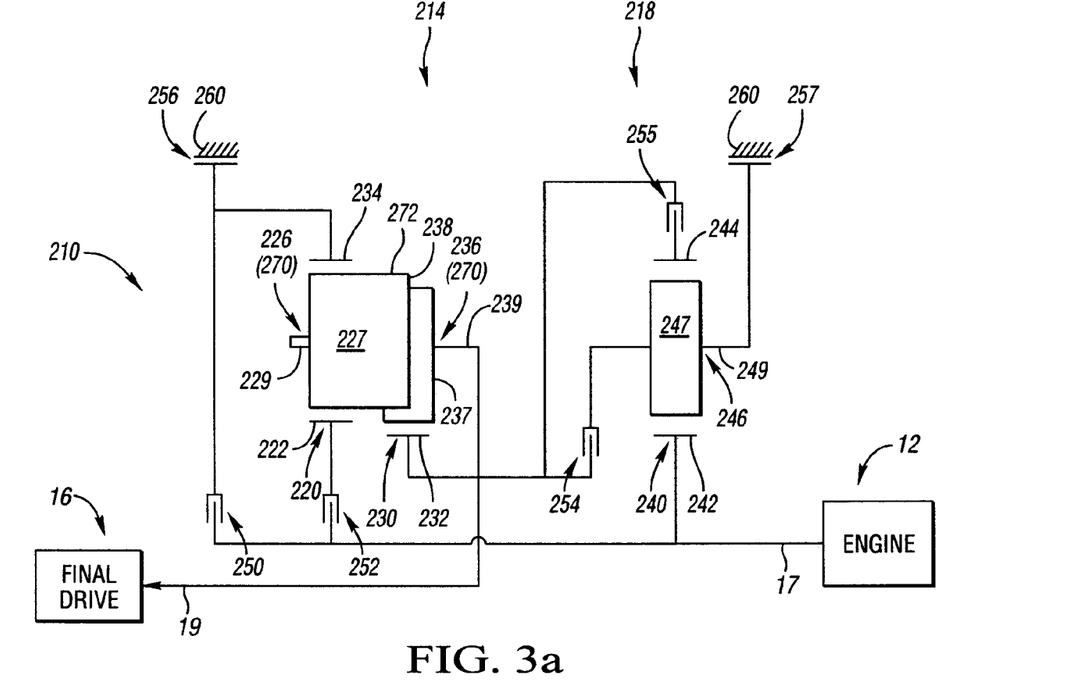
FIG. 3a is a schematic representation of a powertrain having a planetary transmission incorporating another family member of the present invention.

Turning to FIG. 3a, a powertrain 210 includes the engine 12, a planetary transmission 214, and a final drive mechanism 16. The planetary transmission 214 includes an input shaft 17 continuously connected with the engine 12, a planetary gear arrangement 218, and an output shaft 19 continuously connected with the final drive mechanism 16. The planetary gear arrangement 218 includes three planetary gear sets 220, 230 and 240.

The planetary gear set 220 includes a sun gear member 222, a ring gear member 224 and a planet carrier assembly member 226. The planet carrier assembly member 226 includes a plurality of pinion gears 227 rotatably mounted on a carrier member 229. The pinion gears 227 are disposed in meshing relationship with both the sun gear member 222 and the ring gear member 224.

The planetary gear set 230 includes a sun gear member 232 and a planet carrier assembly member 236. The planet carrier assembly member 236 includes a plurality of pinion gears 237, 238 rotatably mounted on a carrier member 239. The pinion gears 237 are disposed in meshing relationship with both the sun gear member 232 and the respective pinion gear 238. The pinion gears 238 are integral with the pinion gears 227 (i.e., formed by long pinion gears). The planet carrier assembly member 226 is continuously connected with (integral with) the planet carrier assembly member 236.

The planetary gear set 240 includes a sun gear member 242, a ring gear member 244, and a planet carrier assembly member 246. The planet carrier assembly member 246 includes a plurality of pinion gears 247 rotatably mounted on a carrier member 249 and disposed in meshing relationship with both the sun gear member 242 and with the ring gear member 244.

The planetary gear arrangement 218 also includes six torque-transmitting mechanisms 250, 252, 254, 255, 256 and 257. The torque-transmitting mechanisms 250, 252, 254 and 255 are rotating type torque-transmitting mechanisms, commonly termed clutches. The torque-transmitting mechanisms 256 and 257 are stationary-type torque transmitting mechanisms, commonly termed brakes or reaction clutches.

The input shaft 17 is continuously connected with the sun gear member 242. The output shaft 19 is continuously connected with the planet carrier assembly member 236. The integral connection of the planet carrier assembly members 226, 236 is referred to herein as interconnecting member 270. The integral connection of the long pinion gears 227, 238 is referred to herein as interconnecting member 272.

The ring gear member 224 is selectively connected with the sun gear member 242 through the clutch 250. The sun gear member 222 is selectively connected with the sun gear member 242 through the clutch 252. The sun gear member 232 is selectively connected with the planet carrier assembly member 246 through the clutch 254. The sun gear member 232 is selectively connected with the ring gear member 244 through the clutch 255. The ring gear member 224 is selectively connected with the transmission housing 260 through the brake 256. The planet carrier assembly member 246 is selectively connected with the transmission housing 260 through the brake 257.

Figure 3B:
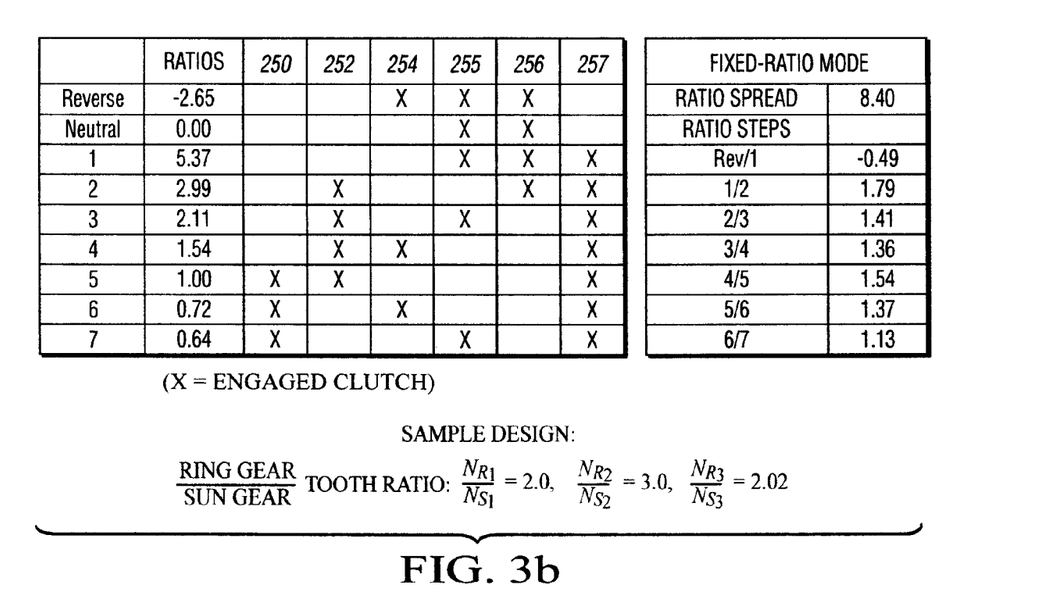

As shown in the truth table in FIG. 3b, the torque-transmitting mechanisms are engaged in combinations of three to establish seven speed ratios and one reverse speed ratio.

As previously set forth, the truth table of FIG. 3b describes the combinations of engagements utilized for the forward and reverse speed ratios. The truth table also provides an example of speed ratios that are available with the family member described above. These examples of speed ratios are determined utilizing the tooth ratios given in FIG. 3b. The $N_{R1}/N_{S1}$ value is the tooth ratio of the planetary gear set 220; the $N_{R2}/N_{S2}$ value is the tooth ratio of the planetary gear set 230; and the $N_{R3}/N_{S3}$ value is the tooth ratio of the planetary gear set 240. Also depicted in FIG. 3b is a chart representing the ratio steps between adjacent forward speed ratios and between the first and reverse speed ratio. For example, the first to second ratio interchange has a step of 1.79.

Figure 4A:
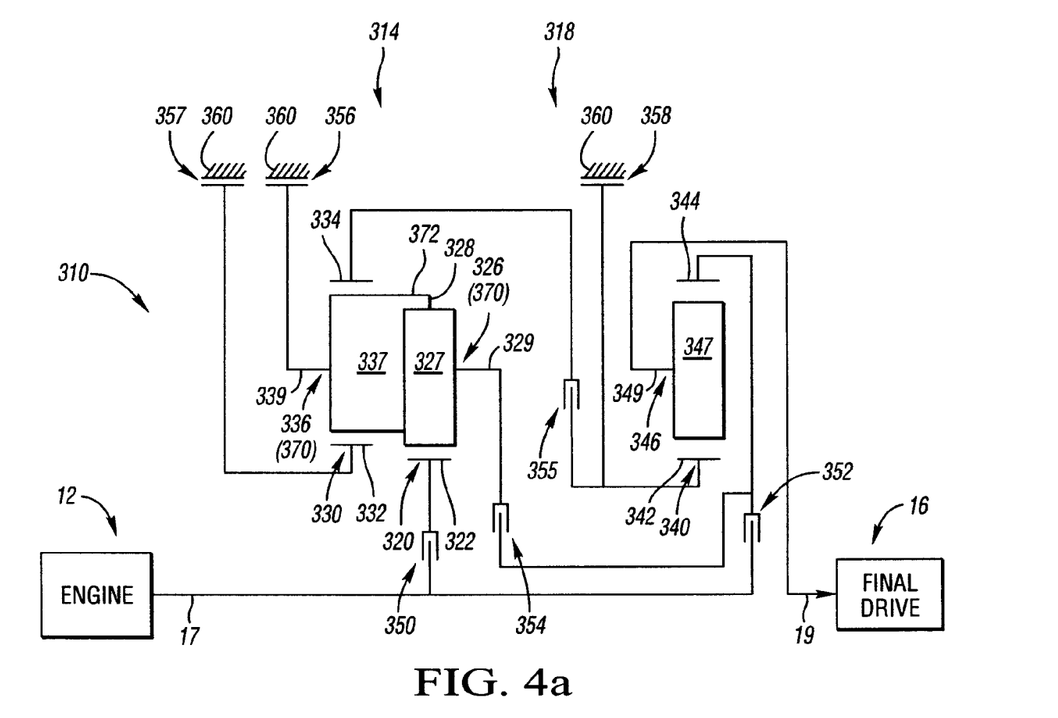
FIG. 4a is a schematic representation of a powertrain having a planetary transmission incorporating another family member of the present invention.

A powertrain 310, shown in FIG. 4a, includes the engine 12, a planetary transmission 314, and the final drive mechanism 16. The planetary transmission 314 includes an input shaft 17 continuously connected with the engine 12, a planetary gear arrangement 318, and an output shaft 19 continuously connected with the final drive mechanism 16. The planetary gear arrangement 318 includes three planetary gear sets 320, 330 and 340.

The planetary gear set 320 includes a sun gear member 322 and a planet carrier assembly member 326. The planet carrier assembly member 326 includes a plurality of pinion gears 327, 328 rotatably mounted on a carrier member 329. The pinion gears 327 are disposed in meshing relationship with both the sun gear member 322 and the respective pinion gear 328.

The planetary gear set 330 includes a sun gear member 332, a ring gear member 334, and a planet carrier assembly member 336. The planet carrier assembly member 336 includes a plurality of pinion gears 337 rotatably mounted on a carrier member 339 and disposed in meshing relationship with both the sun gear member 332 and the ring gear member 334. The pinion gears 337 are integral with the pinion gears 328 (i.e., formed by long pinion gears). The planet carrier assembly member 326 is continuously connected with (integral with) the planet carrier assembly member 336.

The planetary gear set 340 includes a sun gear member 342, a ring gear member 344, and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

The planetary gear arrangement 318 also includes seven torque-transmitting mechanisms 350, 352, 354, 355, 356, 357 and 358. The torque-transmitting mechanisms 350, 352, 354 and 355 are rotating type torque-transmitting mechanisms, commonly termed clutches. The torque-transmitting mechanisms 356, 357 and 358 are stationary-type torque transmitting mechanisms, commonly termed brakes or reaction clutches.

The output shaft 19 is continuously connected with planet carrier assembly member 346. The integral connection of the planet carrier assembly members 326, 336 is referred to herein as interconnecting member 370. The integral connection of the pinion gears 328, 337 is referred to herein as interconnecting member 372.

The sun gear member 322 is selectively connected with the input shaft 17 through the input clutch 350. The ring gear member 344 is selectively connected with the input shaft 17 through the clutch 352. The planet carrier assembly member 326 is selectively connected with the ring gear member 344 through the clutch 354. The ring gear member 334 is selective connected with the sun gear member 342 through the clutch 355. The planet carrier assembly member 336 is selectively connected with the transmission housing 360 through the brake 356. The sun gear member 332 is selectively connected with the transmission housing 360 through the brake 357. The sun gear member 342 is selectively connected with the transmission housing 360 through the brake 358.

Figure 4B:
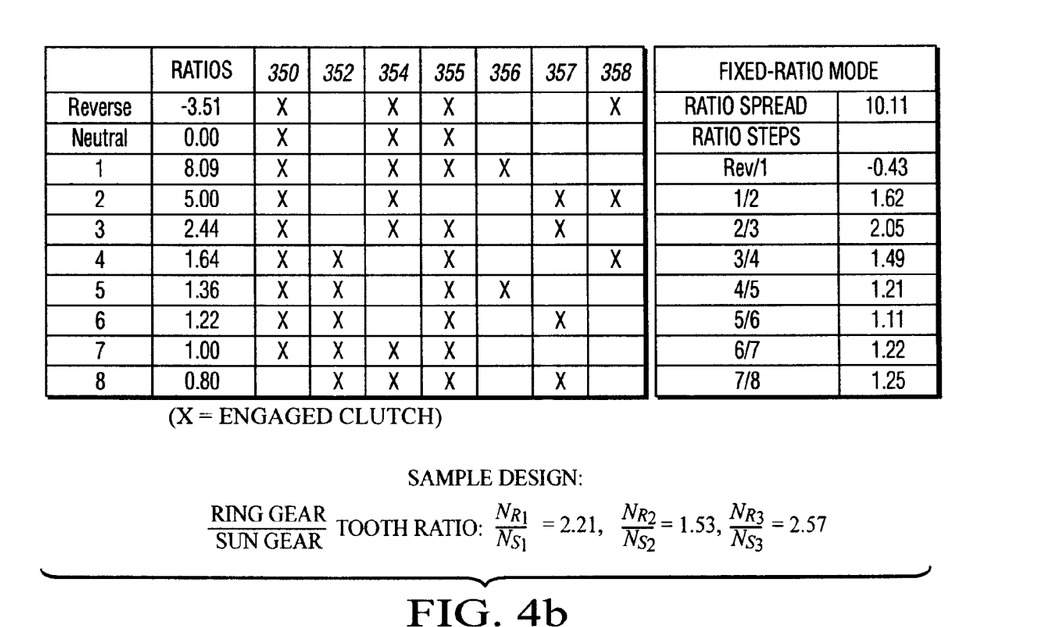

The truth table shown in FIG. 4b describes the engagement combination and the engagement sequence necessary to provide one reverse drive ratio and eight forward speed ratios. A sample of the numerical values for the ratios is also provided in the truth table of FIG. 4b. These values are determined utilizing the ring gear/sun gear tooth ratios also given in FIG. 4b. The $N_{R1}/N_{S1}$ value is the tooth ratio for the planetary gear set 320; the $N_{R2}/N_{S2}$ value is the tooth ratio for the planetary gear set 330; and the $N_{R3}/N_{S3}$ value is the tooth ratio for the planetary gear set 340. Also given in FIG. 4b is a chart describing the step ratios between the adjacent forward speed ratios and the reverse to first forward speed ratio. For example, the first to second forward speed ratio step is 1.62.

Figure 5A:
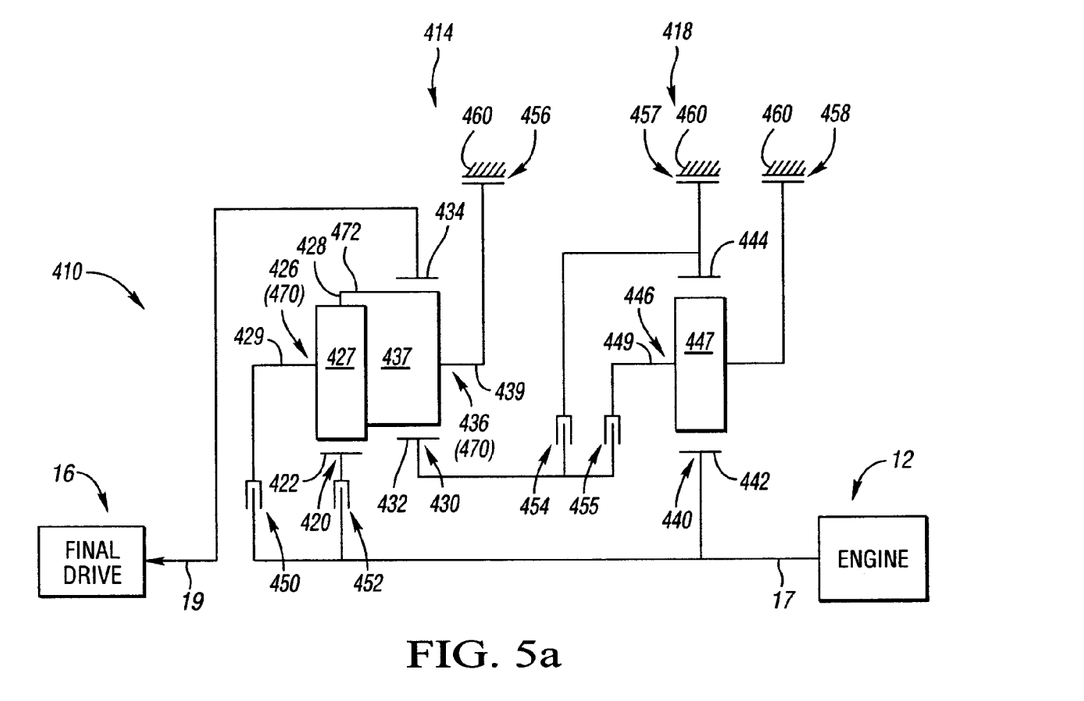
FIG. 5a is a schematic representation of a powertrain having a planetary transmission incorporating another family member of the present invention.

A powertrain 410, shown in FIG. 5a, includes the engine 12, a planetary transmission 414 and the final drive mechanism 16. The planetary transmission 414 includes a planetary gear arrangement 418, input shaft 17 and output shaft 19. The planetary gear arrangement 418 includes three planetary gear sets 420, 430 and 440.

The planetary gear set 420 includes a sun gear member 422 and a planet carrier assembly 426. The planet carrier assembly 426 includes a plurality of pinion gears 427, 428 rotatably mounted on a carrier member 429. The pinion gears 427 are disposed in meshing relationship with both the sun gear member 422 and the respective pinion gear 428.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the ring gear member 434 and the sun gear member 432. The pinion gears 437 are integral with the pinion gears 428 (i.e., formed by long pinions). The planet carrier assembly member 436 is continuously connected with (integral with) the planet carrier assembly member 426.

The planetary gear set 440 includes a sun gear member 442, a ring gear member 444, and a planet carrier assembly member 446. The planet carrier assembly member 446 includes a plurality of pinion gears 447 rotatably mounted on a carrier member 449 and disposed in meshing relationship with both the sun gear member 442 and the ring gear member 444.

The planetary gear arrangement 418 also includes seven torque-transmitting mechanisms 450, 452, 454, 455, 456, 457 and 458. The torque-transmitting mechanisms 450, 452, 454 and 455 are rotating type torque-transmitting mechanisms, commonly termed clutches. The torque-transmitting mechanisms 456, 457 and 458 are a stationary-type torque transmitting mechanisms, commonly termed brakes or reaction clutches.

The input shaft 17 is continuously connected with the sun gear member 442. The output shaft 19 is continuously connected with the ring gear member 434. The integral connection of the planet carrier assembly members 426, 436 is referred to herein as interconnecting member 470. The integral connection of the pinion gears 428, 437 is referred to herein as interconnecting member 472.

The planet carrier assembly member 426 is selectively connected with the sun gear member 442 through the clutch 450. The sun gear member 422 is selectively connected with the sun gear member 442 through the clutch 452. The sun gear member 432 is selectively connected with the ring gear member 444 through the clutch 454. The sun gear member 432 is selectively connected with the planet carrier assembly member 446 through the clutch 455. The planet carrier assembly member 436 is selectively connected with the transmission housing 460 through the brake 456. The ring gear member 444 is selectively connected with the transmission housing 460 through the brake 457. The planet carrier assembly member 446 is selectively connected with the transmission housing 460 through the brake 458.

Figure 5B:
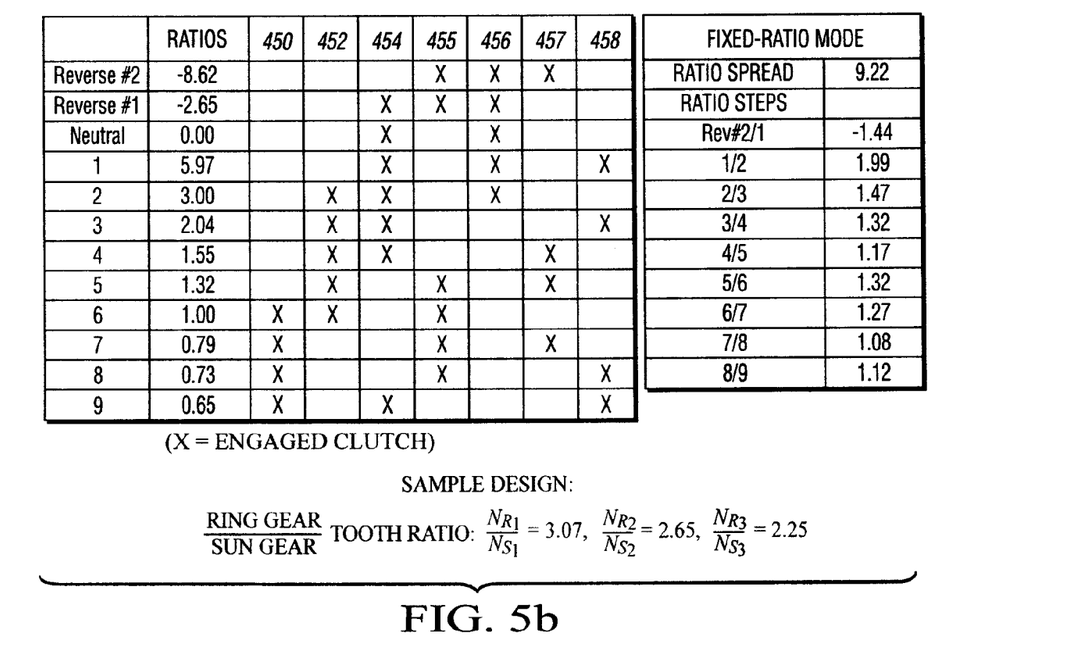

The truth table shown in FIG. 5*b* describes the engagement combination and sequence of the torque-transmitting mechanisms 450, 452, 454, 455, 456, 457 and 458 that are employed to provide the forward and reverse drive ratios.

Also given in the truth table of FIG. 5*b* is a set of numerical values that are attainable with the present invention utilizing the ring gear/sun gear tooth ratios shown. The $N_{R1}/N_{S1}$ value is the tooth ratio of the planetary gear set 420; the $N_{R2}/N_{S2}$ value is the tooth ratio of the planetary gear set 430; and the $N_{R3}/N_{S3}$ value is the tooth ratio of the planetary gear set 440. FIG. 5*b* also provides a chart of the ratio steps between adjacent forward ratios and between the reverse and first forward ratio. For example, the ratio step between the first and second forward ratios is 1.99.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input shaft;
an output shaft;
first, second and third planetary gear sets each having first, second and third members;
said output shaft being continuously interconnected with a member of said planetary gear sets;
said input shaft being continuously or selectively interconnected with another member of said planetary gear sets;
said first member of said first planetary gear set being continuously interconnected with said first member of said second planetary gear set;
said second member of said first planetary gear set being continuously interconnected with said second member of said second planetary gear set;
a first torque-transmitting mechanism selectively interconnecting a member of said first or second planetary gear set with a member of said third planetary gear set;
a second torque-transmitting mechanism selectively interconnecting another member of said third planetary gear set with said first or second planetary gear sets;
a third torque-transmitting mechanism selectively interconnecting a member of said first or second planetary gear set with said input member or with another member of said third planetary gear set;
a fourth torque-transmitting mechanism selectively interconnecting a member of said first or second planetary gear set with a stationary member;
a fifth torque-transmitting mechanism selectively interconnecting a member of said third planetary gear set with said stationary member;
said torque-transmitting mechanisms being engaged in combinations to establish at least six forward speed ratios and at least one reverse speed ratio between said input shaft and said output shaft.

2. The transmission defined in claim 1, wherein planet carrier assembly members of each of said planetary gear sets are single-pinion carriers.

3. The transmission defined in claim 1, wherein at least one planet carrier assembly member of said planetary gear sets is a double-pinion carrier.

4. The transmission defined in claim 1, wherein said first and second members of said first and second gear sets comprise planet carrier assembly members and pinions, respectively.

5. The transmission defined in claim 1, wherein said first, second and third members are selected from a ring gear member, a sun gear member, a planet carrier assembly member, and a long pinion gear, in any order.

6. The transmission defined in claim 1, further comprising:
a sixth torque-transmitting mechanism selectively interconnecting a member of said third planetary gear set with a member of said first or second planetary gear set or with said input shaft.

7. The transmission defined in claim 6, further comprising:
a seventh torque-transmitting mechanism selectively interconnecting a member of said first, second or third planetary gear set with said stationary member.

8. A multi-speed transmission comprising:
an input shaft;
an output shaft;
a planetary gear arrangement having first, second and third planetary gear sets, each planetary gear set having first, second and third members;
said output shaft being continuously interconnected with a member of said planetary gear sets;
said input shaft being continuously or selectively interconnected with another member of said planetary gear sets;
said first member of said first planetary gear set being continuously interconnected with said first member of said second planetary gear set;
said second member of said first planetary gear set being continuously interconnected with said second member of said second planetary gear set;
five torque-transmitting mechanisms for selectively interconnecting said members of said planetary gear sets with said input shaft, with a stationary member or with other members of said planetary gear sets, said five torque-transmitting mechanisms being engaged in combinations to establish at least six forward speed ratios and at least one reverse speed ratio between said input shaft and said output shaft; wherein a first of said five torque-transmitting mechanisms is operable for selectively interconnecting a member of said first or second planetary gear set with a member of said third planetary gear set;

a second of said five torque-transmitting mechanisms is operable for selectively interconnecting another member of said third planetary gear set with a member of said first or second planetary gear sets; and another one of said five torque-transmitting mechanisms is selectively operable for interconnecting a member of said third planetary gear set with said stationary member.

9. The transmission defined in claim 8, wherein a third of said five torque-transmitting mechanisms is selectively operable for interconnecting a member of said first or second planetary gear set with a member of said third planetary gear set or with said input member.

10. The transmission defined in claim 9, wherein a fourth of said five torque-transmitting mechanisms is selectively operable for interconnecting a member of said first or second planetary gear set with said stationary member.

11. The transmission defined in claim 8, further comprising:

a sixth torque-transmitting mechanism selectively interconnecting a member of said third planetary gear set with a member of said first or second planetary gear set, or with said input member.

12. The transmission defined in claim 11, further comprising:

a seventh torque-transmitting mechanism selectively interconnecting a member of said first, second or third planetary gear set with said stationary member.

13. The transmission defined in claim 8, wherein planet carrier assembly members of each of said planetary gear sets are single-pinion carriers.

14. The transmission defined in claim 8, wherein at least one planet carrier assembly member of said planetary gear sets is a double-pinion carrier.

15. The transmission defined in claim 8, wherein said first and second members of said first and second gear sets comprise pinions and planet carrier assembly members respectively.

16. The transmission defined in claim 8, wherein said first, second and third members are selected from a ring gear member, a sun gear member, a planet carrier assembly member, and a long pinion gear, in any order.

* * * * *